H. H. McNAIR.
CARD GAME.
APPLICATION FILED AUG. 5, 1912.
1,138,678.
Patented May 11, 1915.
4 SHEETS—SHEET 1.
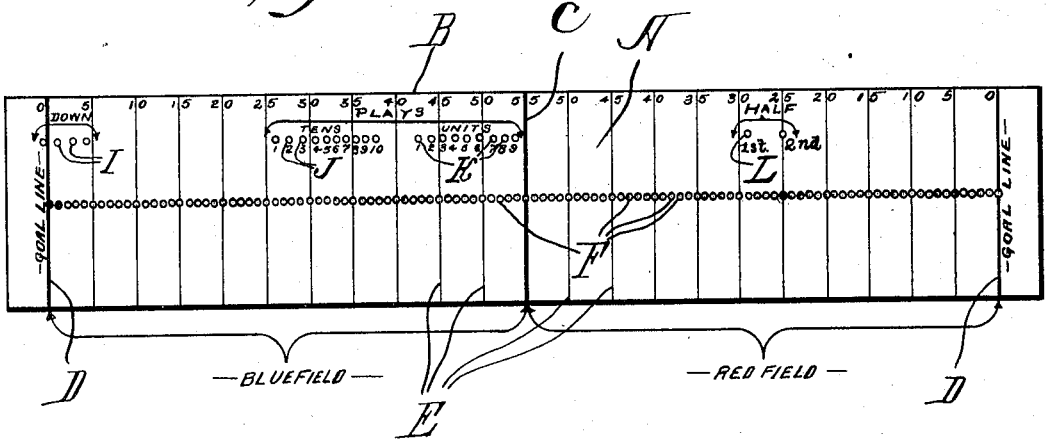
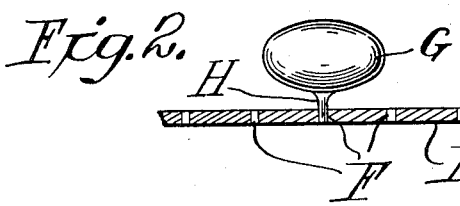
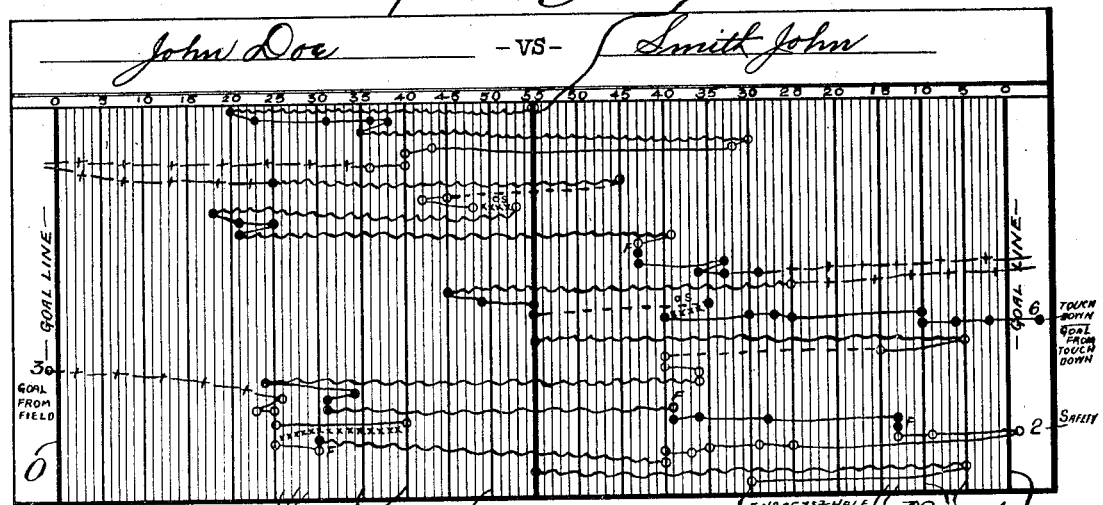
Witnesses:
G. H. Leebach
H. Fischer
Inventor:
Henry H. McNair,
by F. G. Bradbury
Attorney.

H. H. McNAIR.
CARD GAME.
APPLICATION FILED AUG. 5, 1912.

1,138,678.

Patented May 11, 1915.
4 SHEETS—SHEET 2.

Fig. 4.

GF......Unsuccessful
GT......Unsuccessful
P or K..40 yds
(No return)

----------------

3 YARD GAIN (full back
through right
guard)

Fig. 5.

GF......Successful
Inside 45 yd
GT......Successful
P or K..50 yds
(10 yd rtn.)

3 YARD GAIN (full back
through right
guard)

Fig. 6.

GF......Unsuccessful
GT......Unsuccessful
P or K..45 yds
(3 yd rtn.)

----------------

NO GAIN

Fig. 7.

GF......Successful
Inside 20 yds
GT......Successful
P or K..45 yds
(4 yd rtn.)

----------------

5 YARD GAIN (quarterback
around right
end)

Fig. 8.

GF......Successful
Inside 20 yds
GT......Successful
P or K..45 yds
(4 yd rtn.)

----------------

5 YARD GAIN (offside play
by opponents)
first down to side having ball

Fig. 9.

GF......Successful
Inside 40 yds
GT......Successful
P or K..45 yds
(2 yd rtn.)

----------------

2 YARD GAIN (shift play
off tackle)

Fig. 10.

GF......Successful
Inside 40 yds
GT......Successful
P or K..45 yds
(2 yd. rtn.)

----------------

35 YARD GAIN (trick play)

Fig. 11.

GF......Successful
Inside 25 yds
GT......Successful
P or K..45 yds
(No return)

----------------

6 YARD GAIN (trick play)

Fig. 12.

GF......Successful
Inside 25yds
GT......Successful
P or K..45 yds
(No return)

----------------

NO GAIN

Fig. 13.

GF......Successful
Inside 25 yds
GT......Successful
P or K..45 yds
(6yd. return)

----------------

NO GAIN

Fig. 14.

GF......Successful
Inside 25 yds
GT......Successful
P or K..45 yds
(No return)

----------------

10 YARD GAIN (quarterback
around right
end)

Fig. 15.

GF......Successful
Inside 30 yds
GT......Successful
P or K..50 yds,
(5 yd rtn.)

----------------

3 YARD GAIN (full back
through right
guard)

Witnesses:

Inventor:
Henry H. McNair,
by L. G. Bradbury
Attorney.

H. H. McNAIR.
CARD GAME.
APPLICATION FILED AUG. 5, 1912.

1,138,678.

Patented May 11, 1915.

4 SHEETS—SHEET 3.

Fig. 16.
GF......Unsuccessful
GT......Unsuccessful
P or K..50 yds
(25 yd return)

----------------

25 YARD GAIN (forward pass
right half to
left end)

Fig. 17.
GF......Unsuccessful
GT......Unsuccessful
P or K..35 yds
(No return)

----------------

20 YARD GAIN (forward pass
left half to
right end)

Fig. 18.
GF......Unsuccessful
GT......Unsuccessful
P or K..35 yds
(No return)

----------------

15 YARD GAIN (right half
around left
end)

Fig. 19.
GF......Unsuccessful
GT......Unsuccessful
P or K..35 yds
(No return)

----------------

8 YARD GAIN (left half
around right
end)

Fig. 20.
GF......Unsuccessful
GT......Unsuccessful
P or K..35 yds
(No return)

----------------

4 YARD GAIN (right half
off of left
tackle)

Fig. 21.
GF......Unsuccessful
GT......Unsuccessful
P or K..35 yds
(No return)

----------------

4 YARD GAIN (left half
through left
tackle)

Fig. 22.
GF......Unsuccessful
GT......Unsuccessful
P or K..40 yds
(No return)

----------------

4 YARD GAIN (left half
off right
tackle)

Fig. 23.
GF......Unsuccessful
GT......Unsuccessful
P or K..40 yds
(No return)

----------------

4 YARD GAIN (right half
through right
tackle)

Fig. 24.
GF......Unsuccessful
GT......Unsuccessful
P or K..40 yds
(No return)

----------------

3 YARD GAIN (full back
through left
guard)

Fig. 25.
GF......Unsuccessful
GT......Unsuccessful
P or K..40 yds
(No return)

----------------

3 YARD LOSS (full back
through left
guard)

Fig. 26.
GF......Unsuccessful
GT......Unsuccessful
P or K..40 yds
(No return)

----------------

3 YARD LOSS (full back
through right
guard)

Fig. 27.
GF......Successful
Inside 45 yd
GT......Successful
P or K...50 yds
(10 yd rtn)

----------------

5 YARD GAIN (quarterback
around left
end)

Witnesses:
GW Deebach
H L Fischer

Inventor:
Henry H. McNair,
by: F G Bradbury
Attorney.

H. H. McNAIR.
CARD GAME.
APPLICATION FILED AUG. 5, 1912.

1,138,678.

Patented May 11, 1915.
4 SHEETS—SHEET 4.

Fig. 28.

GF......Successful
   Inside 30 yds
GT......Successful
P or K..50 yds
     (5 yd Rtn.)
-----------------

15 YARD LOSS (illegal forward pass
1st down to side having
    ball)

Fig. 29.

GF......Successful
   Inside 30 yds
GT......Successful
P or K..50 yds
     (5 yd rtn.)
-----------------

4 YARD LOSS (attempted
      trick play)

Fig. 30.

GF......Successful
   Inside 35 yds
GT......Successful
P or K..50 yds
     (No return)
-----------------

2 YARD GAIN (left end
  around right
    end)

Fig. 31.

GF......Successful
   Inside 35 yds
GT......Successful
P or K..50 yds
     (No return)
-----------------

3 YARD GAIN (right end
  around left
    end)

Fig. 32.

GF......Successful
   Inside 35 yds
GT......Successful
P or K..50 yds
     (No return)
-----------------

5 YARD LOSS (offside
     play)
down and point to be gained remain
same as before this play.

Fig. 33.

GF......Successful
   Inside 35 yds
GT......Successful
P or K..50 yds
     (No return)
-----------------

8 YARD LOSS (around
  right end)

Fig. 34.

GF......Successful
   Inside 35 yds
GT......Successful
P or K..50 yds
     (No return)
-----------------

10 YARD LOSS (around
    left end)

Fig. 35.

GF......Unsuccessful
GT......Unsuccessful
P or K..40 yd, fumble
S P or K off recovers
    ball)
-----------------

5 YARD LOSS (around
   right end)

Fig. 36.

GF......Successful
   Inside 20 yds
GT......Successful
K.......45 yds
     (4 yd rtn)
P....PB...,. opponents
get ball where K
occured)
-----------------

6 YARD LOSS
(around left
    end)

Fig. 37.

FUMBLE (opponents get ball
except where same
occurs on kick-off
or kickout from 25
yd line.)

Fig. 38.

GF......Unsuccessful
GT......Unsuccessful
P or K..40 yd, (no-
      return)
-----------------

3 YARD GAIN (fake kick)

Witnesses:
*G A Heebach*
*H L Fischer*

Inventor:
Henry H. McNair,
by: *F. Bradbury*
   Attorney.

UNITED STATES PATENT OFFICE.

HENRY H. McNAIR, OF ST. PAUL, MINNESOTA.

CARD GAME.

1,138,678.

Specification of Letters Patent. Patented May 11, 1915.

Application filed August 5, 1912. Serial No. 713,205.

*To all whom it may concern:*

Be it known that I, HENRY H. McNAIR, a citizen of the United States, residing at St. Paul, in the county of Ramsey and State of Minnesota, have invented a new and useful Improvement in Card Games, of which the following is a specification.

The object of this invention is the production of a game apparatus in which the game of foot ball is simulated in cards in connection with a miniature gridiron or score pad. The field game of foot ball as its name implies consists in giving motion to a ball with the feet. In my invention cards are employed played in connection with a miniature gridiron, embodying all the essential features of the game, presenting to the mind of the player a vivid picture of the conditions and details of the particular game and permitting him to use discretionary judgment in the conduct of his play and bring to bear skill and knowledge he may possess relative to the requirements of any particular situation. The game is particularly although not exclusively adapted for two players.

In the accompanying drawings forming part of this specification and with which I have illustrated my invention, Figure 1 is a plan of a foot ball gridiron or diagram which may be employed in playing my improved card game; Fig. 2 is a sectional detail of the gridiron showing the miniature foot ball marker inserted therein; Fig. 3 is a plan of a score tab which may be employed, and Figs. 4 to 38 are plans of the cards.

In the drawings A indicates a foot ball gridiron or diagram representing the scene of action said gridiron being inscribed upon an oblong card or plate B adapted to fold upon the fifty five yard line C midway between the goals D. Each half of the card is graduated by lines E into spaces having denominations of five starting at zero on the goal lines and increasing toward the 55 yard line. For convenience in distinguishing the two sides of the field they may be colored respectively red and blue and the yard lines printed black of differentiating thickness as illustrated. Down a longitudinal center line of the card there are a series of holes F, one hole for every yard on the field. The gridiron card may obviously be made to fold as many times as desired into a small package or may be made of flexible material and rolled to produce compactness.

Two miniature foot balls such as G and respectively colored red and blue to distinguish the players are employed as markers on the gridiron B. Each of these balls is mounted upon a small peg H which is adapted to fit holes F in the gridiron. Four small pegs (not shown) to be used as markers should also be provided.

In addition to the openings F the gridiron may be provided with auxiliary peg holes I, J, K and L by which record can be kept of the number of downs by inserting a peg in the openings I, the number of plays made in units and tens by inserting pegs in the openings J and K, and the number of half games by inserting a peg in the openings L.

In connection with the gridiron a score tab inscribed to represent a foot ball field may be used for keeping a record of the game. This tab M is marked transversely with differentiating yard, five yard, fifty five yard and goal lines N, N', N'', and O. In spaces at one side of the tab the names of the players opposite the respective sides of the field may be written by the players such as "John Doe vs. Smith John."

In carrying my invention into practice it is not necessary to use both the gridiron and the score tab as either may be used alone, the graphic notations on the score tab more completely serving the same function as is performed by the gridiron. The marks employed which will help in scoring on the tab M will be found in rule number 11, hereinafter prescribed.

The cards employed are fifty in number it being understood that any number may be used to increase or decrease the various movements and conditions according to the prescribed rules and regulations of the game of foot ball which may be promulgated. Some of the markings upon the faces of the cards are abbreviated for convenience as follows: GF represents goal from field; GT, goal from touchdown; P or K, punt or kick-off; SP, side punting; K, kick-off; P, punt; and PB, punt blocked. These cards depict the several movements during the game and each indicates upon its surface the gain or loss in yards which may result from the plays. The cards are marked as follows it being understood that the number of cards may be increased or decreased according to revised rules:

Two cards "GF__Unsuccessful; GT__Unsuccessful; P or K__40 yds., no return_____3 yard gain (full back through right guard)." (See Fig. 4.)

One card "GF__Successful, inside 45 yd.; GT__Successful; P or K__50 yds., 10 yd. rtn_____3 yard gain (fullback through right guard)." (See Fig. 5.)

Four cards "GF__Unsuccessful; GT__Unsuccessful; P or K__45 yds., 3 yd. rtn_____ no gain." (See Fig. 6.)

Two cards "GF__Successful, inside 20 yds.; GT__Successful; P or K__45 yds., 4 yd. rtn_____5 yard gain (quarterback around right end)." (See Fig. 7.)

Two cards "GF—Successful inside 20 yds.; GT__Successful; P or K__45 yds., 4 yd. rtn_____5 yard gain (offside play by opponents) first down to side having ball." (See Fig. 8.)

Two cards "GF__Successful, inside 40 yds.; GT__Successful; P or K__45 yds., 2 yd. rtn_____2 yard gain (shift play off tackle)." (See Fig. 9.)

One card "GF__Successful, inside 40 yds.; GT__Successful; P or K__45 yds., 2 yd. rtn_____35 yard gain (trick play)." (See Fig. 10.)

Two cards "GF__Successful, inside 25 yds.; GT__Successful; P or K__45 yds., no return_____6 yard gain (trick play)." (See Fig. 11.)

One card "GF__Successful, inside 25 yds.; GT__Successful; P or K__45 yds., no return_____No gain." (See Fig. 12.)

One card "GF__Successful, inside 25 yds.; GT__Successful; P or K__45 yds., 6 yd. return_____No gain." (See Fig. 13.)

One card "GF__Successful inside 25 yds.; GT__Successful; P or K__45 yds., no return_____10 yard gain (quarterback around right end)." (See Fig. 14.)

Two cards "GF__Successful, inside 30 yds.; GT__Successful; P or K__50 yds., 5 yd. rtn_____3 yard gain (full back through right guard)." (See Fig. 15.)

One card "GF__Unsuccessful; GT__Unsuccessful; P or K__50 yds., 25 yd. return_____25 yard gain (forward pass right half to left end)." (See Fig. 16.)

One card "GF__Unsuccessful; GT__Unsuccessful; P or K__35 yds., no return_____20 yard gain (forward pass left half to right end)." (See Fig. 17.)

One card "GF__Unsuccessful; GT__Unsuccessful; P or K__35 yds., no return_____15 yard gain (right half around left end)." (See Fig. 18.)

One card "GF__Unsuccessful; GT__Unsuccessful; P or K__35 yds., no return_____8 yard gain (left half around right end)." (See Fig. 19.)

One card "GF__Unsuccessful; GT__Unsuccessful; P or K__35 yds., no return_____4 yard gain (right half off of left tackle)." (See Fig. 20.)

One card "GF__Unsuccessful; GT__Unsuccessful; P or K__35yds., no return_____4 yard gain (left half through left tackle)." (See Fig. 21.)

One card "GF__Unsuccessful; GT__Unsuccessful; P or K__40 yds., no return_____4 yard gain (left half off right tackle)." (See Fig. 22.)

One card "GF__Unsuccessful; GT__Unsuccessful; P or K__40 yds., no return_____4 yard gain (right half through right tackle)." (See Fig. 23.)

Four cards "GF__Unsuccessful; GT__Unsuccessful; P or K__40 yds., no return_____3 yard gain (full back through left guard)." (See Fig. 24.)

Two cards "GF__Unsuccessful; GT__Unsuccessful; P or K__40 yds., no return_____3 yard loss (full back through left guard)." (See Fig. 25.)

Two cards "GF__Unsuccessful; GT__Unsuccessful; P or K__40 yds., no return_____3 yard loss (full back through right guard)." (See Fig. 26.)

One card "GF__Successful, inside 45 yd.; GT__Successful; P or K__50 yds., 10 yd. rtn_____5 yard gain (quarterback around left end)." (See Fig. 27.)

One card "GF__Successful; inside 30 yds.; GT__Successful; P or K__50 yds., 5 yd. rtn_____15 yard loss (illegal forward pass 1st down to side having ball)." (See Fig. 28.)

Two cards "GF__Successful, inside 30 yds.; GT__Successful; P or K__50 yds., 5 yd. rtn_____4 yard loss (attempted trick play)." (See Fig. 29.)

One card "GF__Successful, inside 35 yds.; GT__Successful; P or K__50 yds., no return_____2 yard gain (left end around right end)." (See Fig. 30.)

One card "GF__Successful, inside 35 yds.; GT__Successful; P or K__50 yds., no return_____3 yard gain (right end around left end)." (See Fig. 31.)

One card "GF__Successful, inside 35 yds.; GT__Successful; P or K__50 yds., no return_____5 yard loss (offside play) down and point to be gained remained same as before this play." (See Fig. 32.)

One card "GF__Successful, inside 35 yds.; GT__Successful; P or K__50 yds., no return_____8 yard loss (around right end)." (See Fig. 33.)

One card "GF__Successful, inside 35 yds.; GT__Successful; P or K__50 yds., no return_____10 yard loss (around left end)." (See Fig. 34.)

One card "GF__Unsuccessful; GT__Unsuccessful; P or K__40 yds., fumble SP or K off recovers ball_____5 yard loss (around right end)." (See Fig. 35.)

One card "GF__Successful, inside 20 yds.; GT__Successful; K__45 yds., 4 yd. rtn.; P__PB__opponents get ball where K occurred_____6 yard loss (around left end)." (See Fig. 36.)

One card "Fumble (opponents get ball except where same occurs on kick-off or kick-out from 25 yd. line)." (See Fig. 37.)

One card "GF__Unsuccessful; GT__Unsuccessful; P or K__40 yds., no return_____ 3 yard gain (fake kick)." (See Fig. 38.)

The mode of playing the game can best be obtained by observing the following rules. These rules may be varied to suit the various changes incident to foot ball regulations and in order to carry the game into practice it is not necessary to employ all of the detailed rules summarized as follows:

1. The player shall shuffle and cut the cards, the player cutting highest, i. e., 10 yard gain is better than a 5 yard loss, etc., shall have the choice of kicking or receiving the kick-off.

2. The player kicking off shall shuffle the cards and hand them face down to the player who receives the kick-off.

3. The player receiving the kick-off shall then take the top card off the deck, look at the line labeled Punt or Kick-off and shall be governed by it, i. e., if the card reads 50 yard punt or kick-off with a 5 yd. return, he shall place the ball using his colored football on his 5 yard line and shall then advance it 5 yards, as per the instructions. He is now ready for the first scrimmage.

4. The player who has the ball shall then take the next card off the top of the deck and shall continue to do so until he loses the ball, or makes first down. Of course, it is understood that 10 yards must be made in four downs in accordance with the 1912 football rules and that general football rules must be followed. The player can use his own judgment regarding kicking, etc., taking chances if he wishes of losing the ball on downs.

5. Whenever the card "fumble," (Fig. 37) is turned up the ball changes hand, i. e., goes to the opponents on the spot where the fumble occurred, except where such a fumble occurs on the kick-off or when the ball is being kicked out from the 25 yard line. In these two cases it does not count and the next card must be used.

6. After every first down is made or whenever the ball changes hands, the cards shall be reshuffled by the party, who is not in possession of the ball, and handed face down to his opponent.

7. Whenever a ball is punted and goes over the goal line and the return of the kick will not bring it out, it is assumed that the defense have touched the ball down behind their goal line for a touch-back, and the ball as in football shall be taken out to the 25 yard line, where the side making the touchback shall have the option of kicking or putting the ball in play on this line. For example, if a punt of 50 yards with no return was made from the 40 yard line, it would go over the goal line 10 yards and as there was no return it is assumed that the player who caught it touched it down for a touchback and the ball is taken out to the 25 yard line and either punted or put in scrimmage.

8. If it is desired to try for a goal from the field the player desiring to do so must notify his opponent. The top card on the deck is then turned over and the line reading "Goal from the field" decides whether the play was successful or not. If the kick was not successful the ball is taken out to the 25 yard line, where the player who was defending the goal can either kick out or put the ball in play on the 25 yard line. It is assumed here that the ball goes over the goal line and is turned into a touchback by the side defending the goal. If kick was successful ball is taken to center of field where the side scored upon shall have the option of kicking off or receiving the kick-off. This choice also holds good for the kickoff after a touchdown has been recorded.

9. After each touchdown is made the player making the touchdown shall take the next card off the deck and be governed by the line reading "Goal from touchdown" as to whether or not the goal was kicked.

10. The game shall be divided into two halves either by time as 15 minute halves, or by the number of plays, say 50 or 75 to the half, as shall be agreed upon by the players before the game.

11. In order to keep a complete record of the game, the score tabs which go with the game should be used, and every movement of the ball recorded thereon. A few marks which will help in scoring are as follows:

| | |
|---|---|
| O | Ball in possession of one player. |
| ⊙ | Ball in possession of the other player. |
| ∿∿∿ | Punt or kick-off. |
| ——— | Gain or loss in carrying the ball. |
| -- -- -- | Forward pass. |
| O f / ⊙ F | Designates fumble and should be placed wherever one occurs and the ball changes hands on account of it. |
| XXXXXXX | Penalty. |
| o s<br>XXXXXXX | Offside. |
| —+—+— | Try at goal from field or goal from field. |

12. Rules for scoring: The rules for scoring shall be the same as in football and the points shall count as follows:

Touchdown _____ 5 points.
Goal from touchdown_____ 1 point.
Goal from the field_____ 3 points.
Safety, (where the player in possession of the ball is forced by a loss back over his own goal line by his opponent)_____ 2 points.

13. When a player having the ball is forced by a loss behind his own goal line, a safety is scored by his opponents, (2 points) and the ball shall be taken out to the 25 yard line where the player defending the goal shall have the option of kicking out or putting the ball in play at this point. For example, if A has the ball on his own 5 yard line and a card is turned up calling for a loss that is more than 5 yards or equal to the distance to the goal line, it is assumed that A tried to advance the ball but was forced over his own goal line by one of B's players and a safety is scored for B.

14. The players will find numerous instances throughout the game where they will have to use their own judgment and in this way the game becomes not only exciting and interesting but has all the elements of real football, and the player will be confronted with situations requiring his decision as to what had best be done the same as the captain or quarterback of a football team in a regular game.

15. In all scoring or tries for goal from the field, etc., when the ball is forced just to the goal line the score is counted. The same is true of the case where a goal from the field is attempted and the next card shows it to be successful from the line where the ball is in play. For example, if A had the ball on B's 5 yard line and the next card showed a gain of 5 yards, A would be exactly on the goal line of B, not over it, but a touchdown would be scored. If A tries for a goal from the field on B's 35 yard line and the next card reads "Goal from the field inside the 35 yard line successful," a goal would be scored, even though A was technically not inside the 35 yard line.

16. The little marker showing the distance to be gained in 4 downs *i. e.*, placed 10 yards ahead of the ball when it is first down shall not be moved until a new first down is made, or the ball lost. This will enable the players to see what distances they must make. For example, A gets the ball on the 23 yard line, the marker is placed on the 33 yard line and A's football on the 23 yard line. Suppose A makes 3 yards on the first down, 3 on the second and 2 on the third. He will then be 2 yards behind the marker and will know that he must make at least 2 yards on the next play or lose the ball. He can then use his judgment as to kicking or trying to make the distance at the risk of losing the ball. The other markers are used in keeping track of downs, plays, halves, etc.

17. These rules are sufficient for playing the game by amateurs though should any specific case come up not covered by same, general football rules are to be followed and these rules may be modified from year to year to keep in accordance with any changes that may be made in regular football rules.

18. The player in possession of the ball must notify his opponent of his decision to punt.

19. Where a penalty would carry ball over goal line ball is put on the 1 yard line. Should a penalty occur on defenders when ball is inside their 1 yard line, penalty is only half the distance to the goal. Penalty cards are: (1 card) 15 yard loss illegal forward pass. (2 cards) offside by opponents. (1 card) offside by side having ball.

The game can be played by using the gridiron A or the score tab M or both or it may be found more interesting and more comprehending to only record the plays graphically on the tab M as illustrated in Fig. 3. For the purpose of more fully describing the use of the apparatus and mode of playing the first half of a game by two players the following description in detail of the plays is set forth, the plays being illustrated graphically in Fig. 3, attention being directed to the fact that there are a plurality of some of the cards illustrated in the drawings and noted in the above list of cards comprising a pack and that each time the cards are shuffled or reshuffled the entire pack is included: At the start a time limit or number of plays is agreed upon by the players A and B who then shuffle the cards. A for illustration cuts and turns up a card showing a 4 yard gain. B cuts and scores no gain, consequently A has the choice of kicking or receiving the kick-off. A elects to kick-off to B. In accordance with rule No. 2, A shuffles the cards and hands them face down to B. B takes the top card (see Fig. 17) off the deck which shows "P or K, 35 yards, no return", consequently the ball goes to the 20 yard line where B makes no return. B takes the next card (see Fig. 24) off the pack and makes a 3 yard gain, full back through left guard. On the next card (see Fig. 19) B makes 8 yards and first down half back around right end. A shuffles the cards in accordance with rule No. 6, B turns up card (see Fig. 27) which sends quarterback around left end for 5 yards. B turns up card (see Fig. 30) which shows a 2 yard gain, left end around right end. The next card (see Fig. 25) turned up by B shows a loss of 3 yards on an attempted line play, it is now 4th down, 6 yards to gain and B decides to punt. By the next card (see Fig. 9) turned up, B punts 45 yards to A's 30 yard line where A returns the ball 2 yards. The cards are now reshuffled by B and handed to A. It is A's ball on his own 32 yard line and first down. The first card (see Fig. 10) turned by A shows a 35 yard gain on a trick play which carries the ball to B's 44 yard line, as this is first down the cards must be reshuffled by B in accordance with rule No. 6 and handed to A. The next card (see Fig. 5) shows a 3 yard gain, full back through right guard. The next card (see Fig. 6) however shows no gain. The next card (see Fig. 20) shows a 4 yard gain, right half off left tackle. It is now 4th down, 3 yards to gain. A being close enough to B's goal decides to try for the goal from the field inside the 40 yard line and so notifies B in accordance with rule No. 8. The next card (see Fig. 18) turned up by A reads "GF, unsuccessful", therefore the kick was a failure. In accordance with rule No. 8 the ball is brought out to B's 25 yard line where B having a choice elects to punt. The cards are now shuffled by A because the ball changed hands and the cards are then handed to B. B takes the top card (see Fig. 23) which shows thereby a 40 yard punt which carries the ball to A's 45 yard line where A is downed in his tracks. As the ball has again changed hands this time it is in the possession of A, B shuffles the cards and hands them to A. On the first card (see Fig. 17) A makes 20 yards on a forward pass left half to right end. It is now first down and B shuffles the cards again in accordance with rule No. 6 and hands them again to A. A on the next card (see Fig. 24) makes 3 yards, full back through left guard. And the next card (see Fig. 36) turned by A shows a 6 yard loss for A on an attempted run around left end. The next card (see Fig. 32) turned up by A shows a 5 yard loss in the form of a penalty for offside play. It is now 3rd down with 18 yards to gain. A elects to punt and in turning over the next card (see Fig. 21) reads the line "P or K", which shows a 35 yard kick with no return by B thereby assuming B was downed in his tracks. B now has the ball and A shuffles the cards and hands the cards to B. The first card (see Fig. 15) B takes off the deck shows a 3 yard gain full back through right guard. B then adds 4 more "right half off left tackle" by card (see Fig. 20), this makes 3rd down, 3 yards to gain. On an attempted trick play shown by card (see Fig. 29) turned up by B, B loses 4 yards and then decides to punt. Card (see Fig. 31) turned up by B shows a punt of 50 yards, no return. As the ball has again changed hands and is in A's possession B shuffles the deck again and hands it to A. The first card (see Fig. 22) A turns up shows a 4 yard gain, left half off right tackle.

The next card (see Fig. 37) turned by A reads "Fumble" and in accordance with rule No. 5 the ball changes hands, B getting the ball. As B is now in possession of the ball and the same has changed hands A shuffles and hands the cards to B. The first card (see Fig. 13) turned up by B shows no gain. And the second card (see Fig. 14) turned up by B shows a gain of 10 yards quarter back around right end, this makes it first down and the cards are again shuffled by A who hands them to B. The first card (see Fig. 26) turned by B shows a loss of 3 yards full back through right guard. On the next card (see Fig. 24) B makes 3 yards through left guard. The next card (see Fig. 22) turned up by B adds 4 more left half off right tackle, it is now 4th down, 6 yards to gain and B decides to try for the goal from the field inside the 30 yard line and so notifies A. The next card (see Fig. 8) B turns up reads "GF__Successful inside 20 yds." but as B was not inside the 20 yard line the play is therefore unsuccessful. The ball in accordance with rule No. 8 is taken out to A's 25 yard line where A having a choice decides to kick out, B shuffles the cards and hands them to A. The next card (see Fig. 4) turned up this time by A shows a 40 yard punt with no return. The cards are again shuffled by A who hands them to B. B is now in possession of the ball at his own 45 yard line. The first card (see Fig. 23) turned up by B shows a 4 yard gain right half through right tackle. And the next card (see Fig. 11) a 6 yard gain on a trick play. B has made 10 yards in less than 4 downs, it is now first down and the cards are again shuffled by A and handed to B. On the first card (see Fig. 12) turned up by B reads No gain. On the second card (see Fig. 17) B makes a 20 yard gain forward pass left half to right end, bringing the ball to A's 35 yard line. It is now first down and A reshuffles the cards and hands them to B. The first card (see Fig. 32) turned up to B shows a 5 yard loss in the nature of a penalty for offside play. However the next card (see Fig. 14) B turns up shows a 10 yard gain, quarter back around right end. The next card (see Fig. 4) shows a 3 yard gain for B full back through right guard. B has 2 yards to gain on the 3rd down. Next card (see Fig. 30) turned up by B shows a gain of 2 yards on a left end around right end which carries the ball to the 25 yard line for 1st down. A again shuffles and hands cards to B. The next card (see Fig. 18) B turns up shows a 15 yard gain right half around left end and this carries the ball to A's 10 yard line for 1st down. A again shuffles the cards and hands them to B. The next card (see Fig. 13) B turns up shows no gain, while the next card (see Fig. 21) shows a gain for B of 4 yards left half through left tackle. It is now B's ball on A's 6 yard line, 3rd down, 6 yards to gain. Next card (see Fig. 22) shows a gain of 4 yards for B left half through right tackle and brings the ball to the 2 yard line. The next card (see Fig. 19) shows a gain that is more than 2 yards and therefore scores a touchdown for B. In accordance with rule No. 9, B takes the next card (see Fig. 34) off the deck and is governed by the line reading goal from touchdown which in this instance was successful, making a total of 6 points for B, namely a touchdown and a goal from touchdown. The ball is now taken out to the center of the field in accordance with general football rules where A the party scored upon has the choice of kicking or receiving the kick off. A elects to receive the kick off and B shuffles the cards and hands them to A. A takes the top card (see Fig. 27) off the deck which shows a punt of 50 yards to A's 5 yard line where A gets the ball and returns it 10 yards. As the ball has again changed hands B shuffles and hands to A. The first card (see Fig. 16) A turns up shows a 25 yard gain forward pass right half to left end which carries the ball to A's 40 yard line. As this makes another first down, cards are reshuffled by B and again handed to A. Next play (see Fig. 12) nets no gain for A and the next card (see Fig. 29) shows a 4 yard loss for A on an attempted trick play. B again holds A for no gain as shown by card (see Fig. 13) turned up by A and this makes it 4th down, 14 yards to gain and A decides to punt.

On turning up the next card (see Fig. 5) by A, he obtains a 50 yard punt to B's 24 yard line, where B returns the ball 10 yards before being downed. As the cards have again changed hands in accordance with the rules A shuffles and hands to B. First card (see Fig. 25) turned by B shows a loss of 3 yards, on an attempt at left guard. The next play B turns up card (see Fig. 6) shows no gain. At this point of the game in accordance with rule No. 18, B decides to punt and notifies A and on turning the next card (see Fig. 35) gets a punt of 40 yards to A's 39 yard line where A fumbles and B recovers the ball in accordance with instructions on card (see Fig. 35). As the ball changed hands and is in B's possession now, A shuffles the cards and hands them to B. First card (see Fig. 5) turned up by B nets 3 yards gain full back through right guard. And the next card (see Fig. 19) turned up by B adds 8 more yards gain, left half around right end. It is now first down with B in possession of the ball on A's 28 yard line and in accordance with rule No. 6, A shuffles again and hands cards to B. The first card (see Fig. 18) B turns up shows a gain of 15 yards right half around left end. A again shuffles and hands cards to B. On the next card turned up by B, (see Fig. 12) B makes no gain. On the next card (see Fig. 37) B fumbles, A getting the ball on his own 13 yard line. B shuffles the cards and hands to A. A is forced by a 4 yard loss on the next play (see Fig. 29) to his own 9 yard line. On the next play A is forced by a loss of 10 yards (see Fig. 34) behind his own goal line scoring a safety counting 2 points for B. As in general football rules the ball is taken out to A's 25 yard line where A decides to put it in scrimmage. B shuffles cards and hands to A. First card (see Fig. 21) turned up by A nets 4 yards, off left tackle, and the next card (see Fig. 11) turned up by A adds 6 yards more on a trick play. It is now first down, B shuffles again and hands to A. The first card (see Fig. 30) turned up by A nets 2 yards left end around right end. And the next card (see Fig. 24) adds 3 more through left guard. On the next play B holds A for no gain by A's turning up card (see Fig. 6) reading no gain. It is now 4th down, 5 yards to gain. A decides to punt and notifies B. The next card (see Fig. 35) turned up by A shows a 40 yard punt for A to B's 30 yard line where B fumbles and A gets the ball. Cards are reshuffled by B and handed to A. The first card (see Fig. 27) shows a 5 yard gain for A, quarter back around left end. On the next card (see Fig. 28) A is penalized 15 yards for incompleted forward pass and in accordance with general football rules it is first down for A. B shuffles the cards for A. On the next card (see Fig. 18) A makes 15 yards right half around left end and it is now first down. B shuffles for A. The next card (see Fig. 12) A makes no gain. A turns up card (see Fig. 30) reading 2 yard gain left end around right end. On the next card (see Fig. 26) A loses 3 yards on line play. A notifies B of his intention of trying for goal from the field inside the 30 yard line. The next card (see Fig. 9) turned up by A reads "GF 40 yards, successful", A thereby scoring a goal from the field which counts 3 points. In accordance with general football rules the ball is brought out to the center of the field where B being the party last scored upon has the option of kicking or receiving the kick-off. B decides to kick-off to A and B shuffles the cards and hands them to A. A takes the top card (see Fig. 16) off the deck which shows a punt or kickoff of 50 yards with a 25 yard return, meaning thereby that B kicked off to A's 5 yard line where one of A's players gets the ball and carries it 25 yards before being downed. As this was the seventy fifth play, the limit agreed upon at the beginning of game, time is called for the first half with A in possession of the ball on his own 30 yard line. We can therefore, see the possibilities of the game and a detail score of this half is sufficient. As it was B scored a touchdown, kicked a goal from touchdown and made a safety, while A tail score of this half is sufficient. As it was ized for offside play once and once for an incompleted forward pass. B was penalized once for offside play. A tried for goal from the field twice, one of which was successful. B tried once and it was unsuccessful. B fumbled once and A twice. The score at the end of the first half resulted B 8—A 3, arrived at as follows: B secured one touchdown (5 points) kicked one goal from touchdown (1 point) and made a safety on A (2 points). A scored one goal from the field (3 points). It will be noted that during possession of the ball, the entire deck of cards is in the hands of the participant who plays a solitaire game until the ball changes hands and the cards are all passed to an opponent who in turn plays solitaire during his possession of the ball. All of the cards in the deck are offensive no defensive cards being employed. These physical characteristics differ from any other game of this kind.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A game apparatus comprising a diagram laid off to represent a foot ball field, and a deck of cards, each of which contains on one face a series of different plays determining the progress of the ball to and fro over the field and thereby governing the length of time each of the opponents is to possess the ball.

2. A game apparatus comprising a deck of cards, each of which contains on one face a series of different plays determining the progress of the ball to and fro over the field and thereby governing the length of time each of the opponents is to possess the ball, and a diagram laid off to represent a foot ball field, said diagram having a margin upon which may be indicated the number of plays during each period of the game.

3. A game apparatus comprising a deck of cards for playing the game of foot ball, one face of each of which cards is divided into two sections, each section containing a similar series of different plays determining the progress of the ball to and fro and thereby governing the length of time each of the opponents is to possess the ball.

4. A game apparatus comprising a deck of cards for playing the game of football, each of which cards contains on one face a series of different plays determining the progress of the ball to and fro and thereby governing the length of time each of the opponents is to possess the ball.

5. A game apparatus for playing the game of foot-ball, comprising a deck of cards to be played by one opponent, each of which cards contains a series of plays determining the progress of the ball over the field and thereby governing the length of time such opponent is to possess and play the ball, all of the cards being placed and replaced in the deck from which to draw prior to each play.

6. A game apparatus for playing the game of foot-ball, comprising a deck of cards to be played by one opponent, one card at a time, each of which cards contains on one face a series of similar plays and a series of different plays which determine the movement of the ball over the field and thereby governing the length of time such opponent is to possess and play the ball, the entire deck being played by one opponent singly during his possession of the ball.

In testimony whereof, I have signed my name to this specification, in the presence of two subscribing witnesses.

HENRY H. McNAIR.

Witnesses:
H. L. FISCHER,
G. C. DEEBOCH.